United States Patent
Grove

(10) Patent No.: US 7,497,182 B2
(45) Date of Patent: Mar. 3, 2009

(54) FLOATATION APPARATUS FOR AN ALL TERRAIN VEHICLE

(76) Inventor: Darrel Grove, Box 800, Thorsby, Alberta (CA) T0C 2P0

( * ) Notice: Subject to any disclaimer, the term of this patent is extended or adjusted under 35 U.S.C. 154(b) by 0 days.

(21) Appl. No.: 11/601,007

(22) Filed: Nov. 17, 2006

(65) Prior Publication Data
US 2007/0181049 A1 Aug. 9, 2007

(51) Int. Cl.
*B63B 43/14* (2006.01)
(52) U.S. Cl. .................................. 114/123
(58) Field of Classification Search ............... 114/123; 440/12.5
See application file for complete search history.

(56) References Cited
U.S. PATENT DOCUMENTS

| 2,007,898 | A | * | 7/1935 | Ragsdale ............... 52/692 |
| 4,494,937 | A | | 1/1985 | Riermann |
| 4,522,420 | A | | 6/1985 | Hannappel |
| 4,593,640 | A | | 6/1986 | Blunschi |
| 4,664,051 | A | | 5/1987 | Newkirk |
| 5,673,642 | A | | 10/1997 | Headge |
| 5,979,854 | A | * | 11/1999 | Lundgren et al. ........ 248/354.3 |
| 6,666,735 | B2 | | 12/2003 | Benoit |
| 2002/0129756 | A1 | * | 9/2002 | Myers ..................... 114/354 |

FOREIGN PATENT DOCUMENTS

CA 2 177 463 11/1977

* cited by examiner

*Primary Examiner*—Stephen Avila
(74) *Attorney, Agent, or Firm*—Davis & Bujold, P.L.L.C.

(57) ABSTRACT

A floatation apparatus for an all terrain vehicle, includes a bridging support adapted to extend under the all terrain vehicle from a first side to a second side. The bridging support has a first end and a second end. The bridging support has a first float support extending upwardly and outwardly from the first end which is adapted to suspend a first float member and a second float support extending upwardly and outwardly from the second end which is adapted to suspend a second float member.

2 Claims, 4 Drawing Sheets

FLOATATION APPARATUS FOR AN ALL TERRAIN VEHICLE

This application claims priority from Canadian Application Serial No. 2,537,168 filed Feb. 7, 2006.

FIELD OF THE INVENTION

The present invention relates to a floatation apparatus for an all terrain vehicle (ATV).

BACKGROUND OF THE INVENTION

A number of floatation apparatus for ATV's, are disclosed in the patent literature which have support frames from which floats depend, such as: U.S. Pat. No. 4,494,937 (Riermann 1985); U.S. Pat. No. 4,593,640 (Blunschi 1986); U.S. Pat. No. 4,664,051 (Newkirk 1987); U.S. Pat. No. 5,673,642 (Headge 1997) and Canadian Patent 2,177,463 (Lacasse et al 1997).

SUMMARY OF THE INVENTION

According to the present invention there is provided a floatation apparatus for an all terrain vehicle, which includes a bridging support adapted to extend under the all terrain vehicle from a first side to a second side. The bridging support has a first end and a second end. The bridging support has a first float support extending upwardly and outwardly from the first end which is adapted to suspend a first float member, and a second float support extending upwardly and outwardly from the second end which is adapted to suspend a second float member. Means are provided for mounting the bridging support to an underside of the all terrain vehicle.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
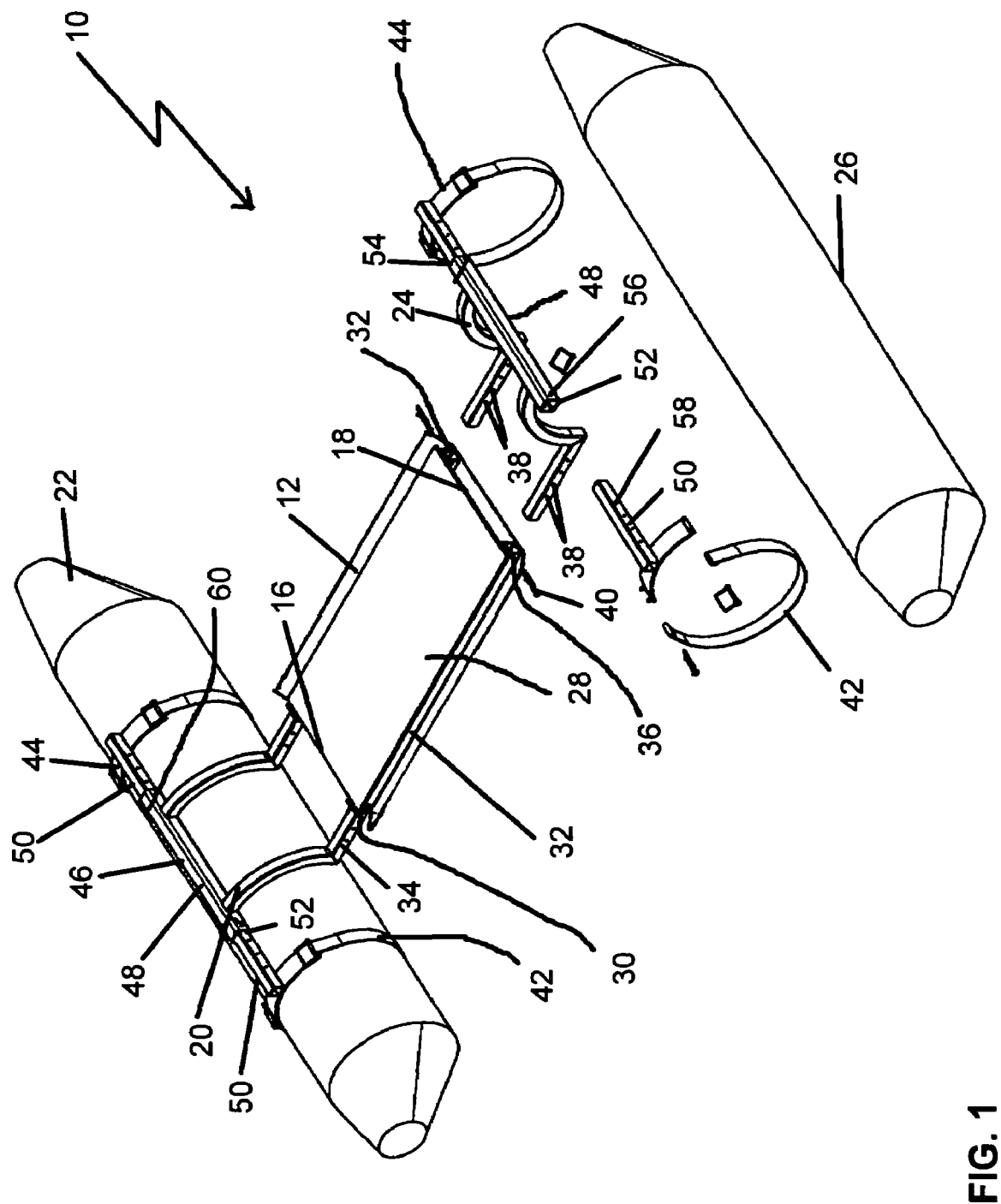
FIG. 1 is a partially exploded perspective view of a floatation apparatus for an all terrain vehicle constructed in accordance with the teachings of the present invention.

The preferred embodiment, a floatation apparatus for an all terrain vehicle (ATV) generally identified by reference numeral 10, will now be described with reference to FIG. 1 through FIG. 4.

Figure 2:
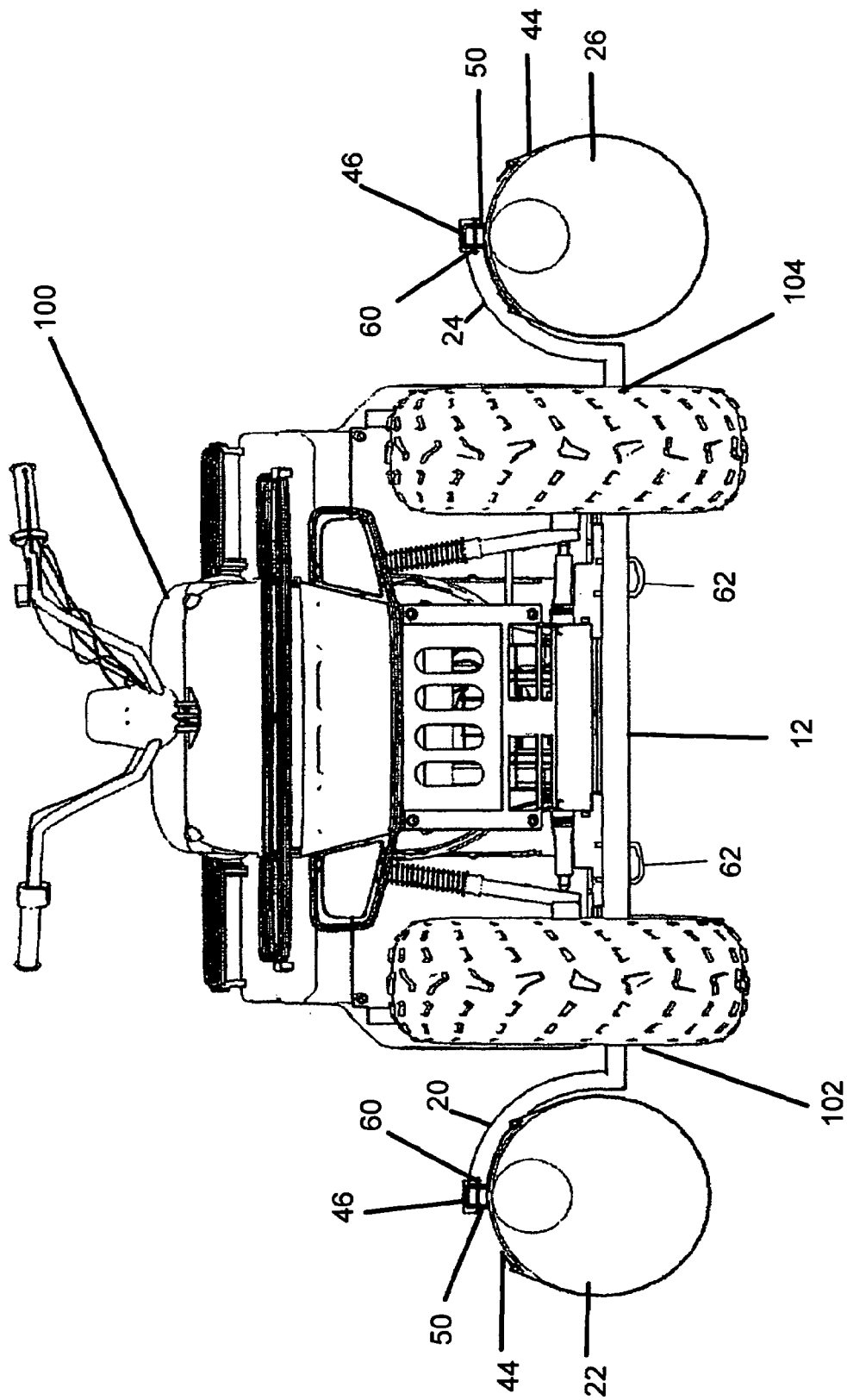
FIG. 2 is a rear elevation view of the floatation apparatus illustrated in FIG. 1, shown installed on an all terrain vehicle.

Structure and Relationship of Parts:

Referring to FIG. 1, floatation apparatus 10 includes a bridging support 12. Referring to FIG. 2, bridging support 12 is adapted to extend under an all terrain vehicle 100 from a first side 102 to a second side 104. Referring to FIG. 1, bridging support 12 has a first end 16 and a second end 18. Bridging support 12 has an arcuate first float support 20 extending upwardly and outwardly from first end 16. First float support 20 is adapted to suspend a first float member 22 across first end 16. Bridging support 12 also has an arcuate second float support 24 extending upwardly and outwardly from second end 18. Second float support 24 is adapted to suspend a second float member 26 across second end 18. It is preferred that bridging support 12 have a protective cover plate 28.

Bridging support 12 will now be further described. Referring to FIG. 1, it is preferred that bridging support 12 have horizontally telescoping extensions, generally indicated by reference numeral 30. Telescoping extensions 30 carry first float support 20 and second float support 24, such that the distance between first float support 20 and second float support 24 is telescopically adjustable. As will hereinafter be further described, means are being provided to affix telescoping extensions 30 in a selected telescopic position. This telescopic adjustment provides a number of advantages. It enables floatation apparatus 10 to be readily adapted to different makes and models of all terrain vehicle 100. It also facilitates reducing the amount of space required during transport. Each of telescoping extensions 30 of bridging support 12 include a pair of parallel spaced first tubular members 32 and a pair of parallel spaced second tubular members 34. First tubular members 32 are permanently secured to bridging support 12. First tubular member 32 has one or more locking pin apertures 36. Second tubular member 34 is telescopically received within first tubular member 32 and has a plurality of axially spaced locking pin apertures 38. Telescopic extensions 30 are affixed in a selected telescopic position by extending a locking pin 40 through locking pin aperture 36 of first tubular member 32 and into a selected one of the plurality of axially spaced locking pin apertures 38 of second tubular member 34.

The connection between first float support 20 with first float member 22 and second float support 24 with second float member 26 will now be further described. Referring to FIG. 1, first float member 22 is detachably secured to first float support 20 by means of straps 42 and 44 that depend from first float support 20. Similarly, second float member 26 is detachably secured to second float support 24 by straps 42 and 44 that depend from second float support 24. Each of first float support 20 and second float support 24 include horizontally telescoping extensions 46 that carry straps 42 and 44. It is preferred that ratchet straps be used, that will maintain their positioned when tightened around the floats. Telescoping extensions 46 are positioned parallel to first end 16 and second end 18 of bridging support 12. Telescoping extensions 46 permit the distance between straps 42 and 44 to be telescopically adjusted. Each of telescoping extensions 46 include a first tubular member 48 and a pair of opposed second tubular members 50 telescopically received within protruding from each of ends 52 and 54 of first tubular member 48. It is preferred that first tubular member 48 be secured to a remote end of each of first float support 20 and second float support 24. First tubular member 48 has a locking pin aperture 56 positioned at each of ends 52 and 54. Each of second tubular members 50 has a plurality of axially spaced locking pin apertures 58. Telescopic extensions 46 are affixed in a selected telescopic position by extending a locking pin 60 through locking pin aperture 56 of first tubular member 48 and into a selected one of the plurality of axially spaced locking pin apertures 58 of each of second tubular members 50. The telescopic adjustment through telescopic extensions 46 enables floatation apparatus 10 to be adapted to differing makes of floats. It also allows float members 22 and 26 to be moved forward or back for better weight distribution when all terrain vehicle 100 is floating in water. The positioning of float members 22 and 26 may need to be altered if more gear is loaded on either the front rack or the back rack. It finally makes floatation apparatus 10 more compact for transport. It is preferred that first float member 22 and second float member 26 be inflatable floats, to make the overall apparatus that much more compact for transport.

It will be appreciated that bridging support 12 must be mounted to an underside of all terrain vehicle 100. Referring to FIG. 2, a preferred means of securing bridging support 12 to all terrain vehicle 100 is through the use of U bolts 62.

Operation

Figure 3:
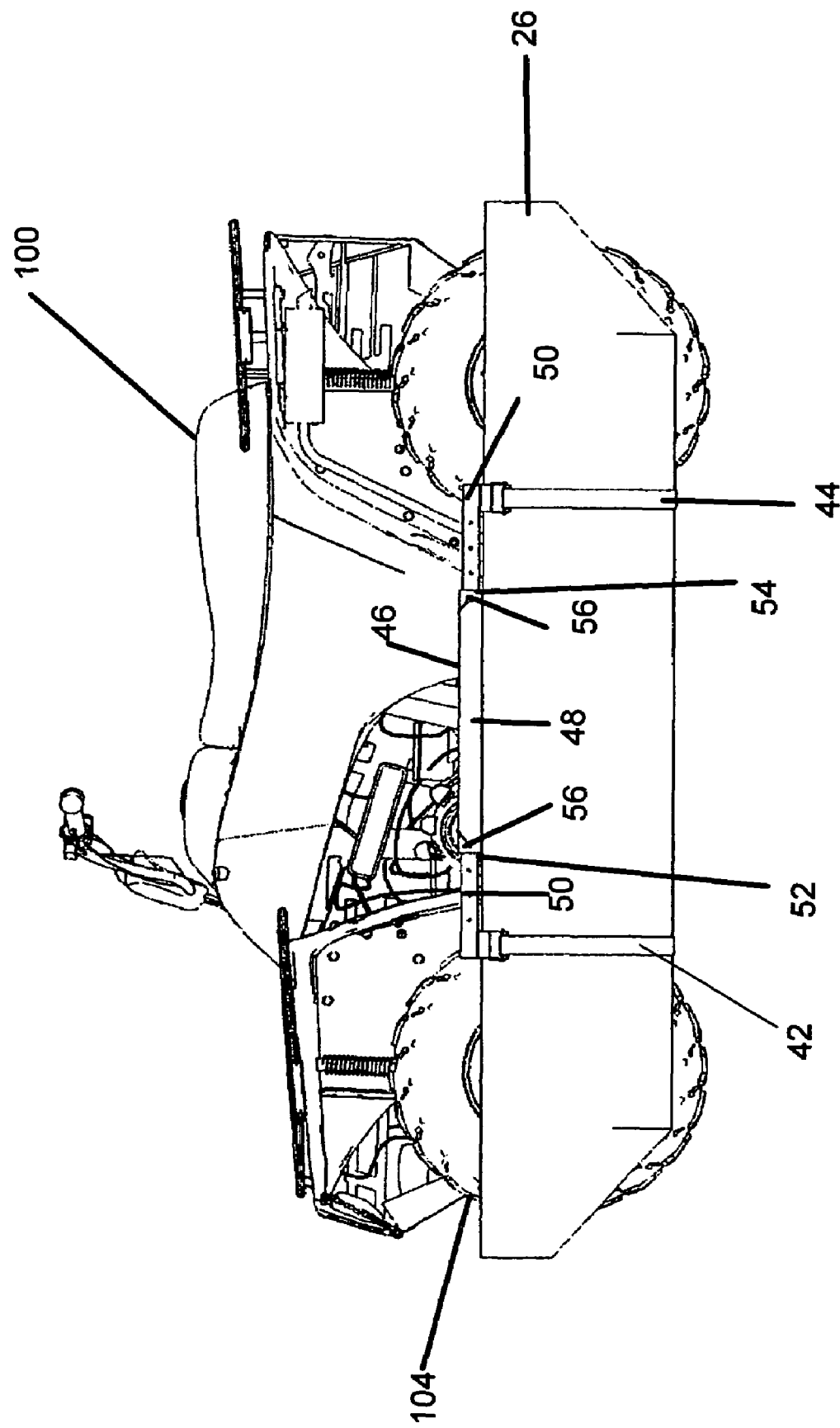
FIG. 3 is a side elevation view of the floatation apparatus illustrated in FIG. 1, shown installed on the all terrain vehicle.
Figure 4:
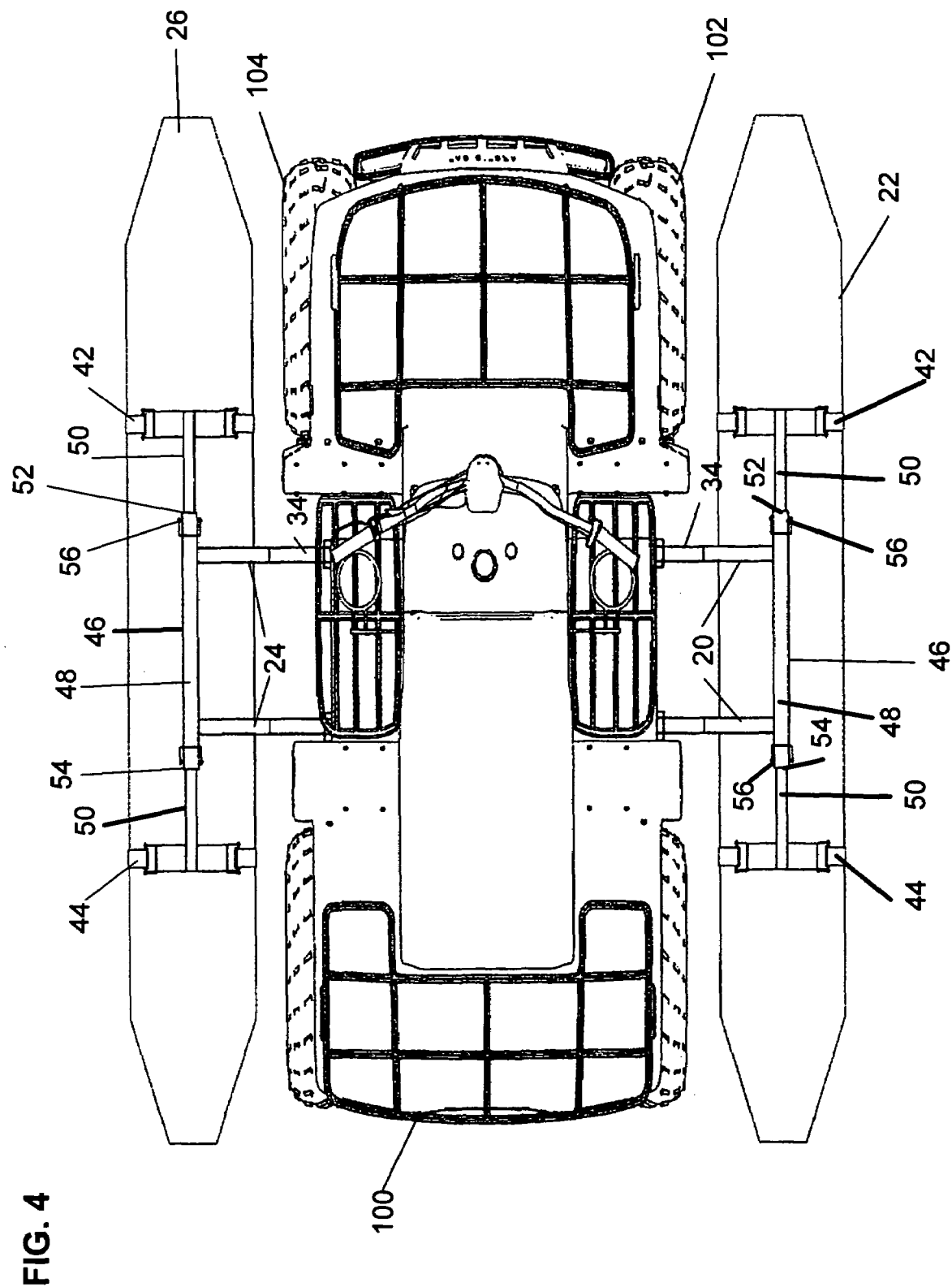
FIG. 4 is a top plan view of the floatation apparatus illustrated in FIG. 1, shown installed on the all terrain vehicle.

The use and operation of floatation apparatus 10 will now be further described with reference to FIG. 1 and FIG. 2. Referring to FIG. 2, bridging support 12 is mounted to an underside of all terrain vehicle 100 by means of U bolts 62 prior to use, with bridging support extending between first side 102 and second side 104. Second tubular members 34 of telescoping extensions 30, second tubular members 50 of telescoping extensions 46, inflatable float members 22 and 26 and straps 42 and 44 are stowed in a carrying bag (not shown) which is strapped to one of the carrying racks of all terrain vehicle 100. All terrain vehicle 100 is then driven into wilderness areas. Referring to FIG. 2, when a body of water is encountered where floatation apparatus 10 is required, second tubular members 34 of telescoping extensions 30, second tubular members 50 of telescoping extensions 46, inflatable float members 22 and 26 and straps 42 and 44 are removed from the carrying bag. It is preferred that first float support 20 and second float support 24 be permanently secured by welding to second tubular members 34 of telescoping extensions 30. First float support 20 and second float support 24 are placed in position by inserting second tubular members 34 into first tubular members 32 which are attached to and form part of bridging support 12. Locking pin 40 is then inserted into locking pin aperture 36 of first tubular member 32 and a selected one of locking pin apertures 38 of second tubular member 34 to lock telescopic extension 30 in a selected telescopic position. Telescoping extensions 30 allow the width of floatation apparatus 10 to be adjusted to accommodate the differing size, buoyancy and stability requirements of different makes and models of all terrain vehicle 100. First float member 22 and second float member 26 are inflated in preparation for installation. It is preferred that first tubular members 48 be permanently secured by welding to remote ends of first float support 20 and second float support 24. Referring to FIGS. 3 and 4 second tubular members 50 of telescoping extensions 46 are then inserted into tubular member 48. Straps 42 and 44 are carried by second tubular members 50. Straps 42 and 44 are used to secure first float member 22 and second float member 26 to first float support 20 and second float support 24, respectively. Second tubular members 50 of telescoping extensions 46 are used to place straps 42 and 44 in a desired position. Referring to FIG. 1, locking pin 60 is then inserted into locking pin aperture 56 of first tubular member 48 and into a selected one of locking apertures 58 to lock telescoping extensions 46 in a selected telescopic position. Referring to FIG. 2, during use cover plate 28 protects the underside of all terrain vehicle 100 from damage inflicted by hazards underwater or along the ground. When the body of water has been crossed, second tubular members 34 of telescoping extensions 30, second tubular members 50 of telescoping extensions 46, inflatable float members 22 and 26 and straps 42 and 44 are again stowed in a carrying bag. Bridging support 12 is left connected to the underside of all terrain vehicle 100.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A floatation apparatus for an all terrain vehicle, comprising:

a bridging support adapted to extend under the all terrain vehicle from a first side to a second side, the bridging support having a first end and a second end, the bridging support having a first float support extending upwardly and outwardly from the first end which is adapted to suspend a first float member, and a second float support extending upwardly and outwardly from the second end which is adapted to suspend a second float member, the bridging support having a protective cover plate;

the bridging support includes horizontally telescoping extensions that carry the first float support and the second float support such that the distance between the first float support and the second float support can be telescopically adjusted, means being provided to affix the telescoping extensions in a selected telescopic position, each of the telescoping extensions of the bridging support include a first tubular member having at least one locking pin apertures, a second tubular member which is telescopically received within the first tubular member, the second tubular member having a plurality of axially spaced locking pin apertures, the telescopic extensions being affixed in a selected telescopic position by extending a locking pin through the at least one locking pin aperture of the first tubular member and into a selected one of the plurality of axially spaced locking pin apertures of the second tubular member;

the first float is detachably secured to the first float support by straps that depend from the first float support and the second float is detachably secured to the second float support by straps that depend from the second float support, each of the first float support and the second float support include horizontally telescoping extensions that carry the straps, such that the distance between the straps is telescopically adjustable, each of the telescoping extensions of the first float support and the second float support includes a first tubular member having at least one locking pin apertures, a second tubular member which is telescopically received within the first tubular member, the second tubular member having a plurality of axially spaced locking pin apertures, the telescopic extensions being affixed in a selected telescopic position by extending a locking pin through the at least one locking pin aperture of the first tubular member and into a selected one of the plurality of axially spaced locking pin apertures of the second tubular member, and means for mounting the bridging support to an underside of the all terrain vehicle.

2. The floatation apparatus as defined in claim 1, wherein each of the first float member and the second float member are inflatable.

* * * * *